US 7,953,845 B2

(12) United States Patent
Black et al.

(10) Patent No.: US 7,953,845 B2
(45) Date of Patent: May 31, 2011

(54) NETWORK-SPECIFIC ESTIMATION IN NETWORK NODE DISCOVERY (75) Inventors: Richard John Black, Cambridge (GB); Heimir Thor Sverrisson, Reykjavik (IS)

(73) Assignee: Microsoft Corporation, Redmond, WA (US)

( * ) Notice: Subject to any disclaimer, the term of this patent is extended or adjusted under 35 U.S.C. 154(b) by 1484 days.

(21) Appl. No.: 11/302,681

(22) Filed: Dec. 14, 2005

(65) Prior Publication Data
US 2006/0167965 A1  Jul. 27, 2006

Related U.S. Application Data (63) Continuation-in-part of application No. 10/955,938, filed on Sep. 30, 2004, now abandoned.

(51) Int. Cl.
G06F 15/173 (2006.01)
(52) U.S. Cl. .................. 709/224; 370/222; 370/248
(58) Field of Classification Search .......... 709/224
See application file for complete search history.

(56) References Cited

U.S. PATENT DOCUMENTS

| 5,859,835 | A |  | 1/1999 | Varma et al. |
| 5,948,064 | A |  | 9/1999 | Bertram |
| 6,233,611 | B1 |  | 5/2001 | Ludtke |
| 6,246,409 | B1 |  | 6/2001 | Veghte |
| 6,952,396 | B1 | * | 10/2005 | Cottreau et al. ............ 370/222 |
| 7,319,671 | B1 | * | 1/2008 | Mohan .................. 370/248 |
| 7,555,545 | B2 |  | 6/2009 | McCasland |
| 7,660,891 | B2 |  | 2/2010 | Black |
| 2002/0136231 | A1 |  | 9/2002 | Leatherbury et al. |
| 2002/0152299 | A1 |  | 10/2002 | Traversat |
| 2003/0097438 | A1 |  | 5/2003 | Bearden et al. |
| 2004/0174829 | A1 |  | 9/2004 | Ayyagari et al. |
| 2005/0125529 | A1 |  | 6/2005 | Brockway |
| 2005/0157720 | A1 |  | 7/2005 | Chandhok et al. |
| 2006/0075113 | A1 |  | 4/2006 | Black |
| 2006/0124720 | A1 |  | 6/2006 | Burbridge et al. |
| 2006/0168276 | A1 |  | 7/2006 | Black |

OTHER PUBLICATIONS

Black, R. et al., "Fast Scalable Robust Node Enumeration", Lecture Notes in Computer Science—Networking 2005, May 2, 2005, 12 pages.
Extended European Search Report, dated Mar. 18, 2009 for Application No. 06844861.2, 9 pages.
International Search Report dated Apr. 27, 2007 for Application No. PCT/US2006/046471, 10 pages.
"Advisory Action", U.S. Appl. No. 11/302,651, (Feb. 24, 2009), 2 pages.
"Final Office Action", U.S. Appl. No. 11/302,651, (Dec. 10, 2008), 12 pages.
"International Search Report", Application No. PCT/US2006/046472, (Apr. 27, 2007), 10 pages.
"Non-Final Office Action", U.S. Appl. No. 11/302,651, (May 29, 2008), 11 pages.

(Continued)

Primary Examiner — Vivek Srivastava
Assistant Examiner — Vivek Krishnan (57) ABSTRACT Network node discovery is implemented using parameters reflecting network-specific characteristics. Estimates of the number of active nodes in a network are computed based on the presence of dead time (e.g., due to clock latency, device driver delays, etc.), network topology, packet size, network capacity, a tolerable network overload threshold, and other characteristics. A network node enumeration process is therefore parameterized to incorporate consideration of such characteristics. A damping factor that incorporates dead time to set a lower bound for an estimate of remaining active nodes in a network is one example of a network-specific parameter.

16 Claims, 7 Drawing Sheets

OTHER PUBLICATIONS

"Non-Final Office Action", U.S. Appl. No. 11/302,651, (Jun. 2, 2009),13 pages.

"Notice of Allowance", U.S. Appl. No. 11/302,651, (Oct. 8, 2009),6 pages.

* cited by examiner

NETWORK-SPECIFIC ESTIMATION IN NETWORK NODE DISCOVERY

CROSS-REFERENCE TO RELATED APPLICATIONS

This application is a continuation-in-part application of U.S. patent application Ser. No. 10/955,938, entitled "Network Node Enumeration" and filed on Sep. 30, 2004, specifically incorporated herein by reference for all that it discloses and teaches.

This application is also related to U.S. patent application Ser. No. 11/302,726, entitled "Node Discovery Involving Multiple Node Enumerators", and U.S. patent application Ser. No. 11/302,651, entitled "Node Discovery Involving Stealth Node Enumerators", both filed concurrently herewith, which are specifically incorporated herein by reference for all that they disclose and teach.

BACKGROUND

A local area network (LAN) is a computer network covering a small local area, like a home, office, or small group of buildings, such as a business or college campus. Modern LANs are most likely based on switched Ethernet or Wi-Fi technology running at from 10 to 1000 Mb/s (megabits per second), although other technologies may also be employed. Typical characteristics of LANs, in contrast to wide area networks (WANs), may include: (a) much higher data rates, (b) smaller geographic range; and (c) a lack of leased telecommunication lines.

Network node discovery can be used in a computer network, such as a LAN, to identify other devices or nodes within the network. Typically, a specific node (referred to as an "enumerator") requests responses from other nodes (referred to as "responders") in the network. In the manner, the enumerator can develop a list of the other active nodes within the network. Network node discovery results can be used, for example, to identify entry of devices into the network, to detect the removal of devices from the network, to optimize routing and load balancing, etc.

However, techniques and parameters for network node discovery can be highly network dependent. Existing approaches tend to employ gross approximations of such parameters without consideration of the characteristics of the individual network being discovered, thereby slowing down the network node discovery or unnecessarily increasing network traffic during discovery.

SUMMARY

Implementations described and claimed herein address some of the foregoing problems by developing network-specific parameters for use in performing network node discovery. Network node discovery is implemented using parameters reflecting network-specific characteristics. For example, estimates of the number of active nodes in a network are computed based on the presence of dead time (e.g., due to clock latency, device driver delays, etc.), network topology, packet size, network capacity, a tolerable network overload threshold, and other characteristics. In one implementation, a damping factor incorporates dead time to set a lower bound for an estimate of remaining active nodes in a network. A network node enumeration process is therefore parameterized to incorporate consideration of such network-specific characteristics.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Described herein are various implementations of systems and methods for network node enumeration. In accordance with some of the systems and methods described herein, one or more enumerating nodes (i.e., "enumerators") send an enumeration request to other nodes in the network. In response to receiving an enumeration request, nodes (i.e., "responders") that are accessible (i.e., "on-line") send an enumeration response that can be received by the enumerators, thereby identifying themselves as accessible to the enumerators. The enumerating nodes then send acknowledgements of the received enumeration responses. In one implementation, the enumerating nodes send such acknowledgements in one or more future enumeration requests.

To reduce excessive network congestion that may arise from a large number of responders sending enumeration responses simultaneously in reply to an enumeration request, enumeration responses are sent from responders at varying times. To lessen the likelihood that a malicious node may instigate the simultaneous sending of enumeration responses from a large number of accessible nodes, each responder independently determines the time at which it sends its enumeration response.

In some implementations, each responder independently schedules the time or times at which an enumeration response is sent based on observations of network activity and/or predictions of future network activity made at the node. Additionally, in some implementations, each accessible node employs a "round based" scheduling method, where each enumeration response is scheduled to be sent in one of a number of timing rounds.

Figure 1:
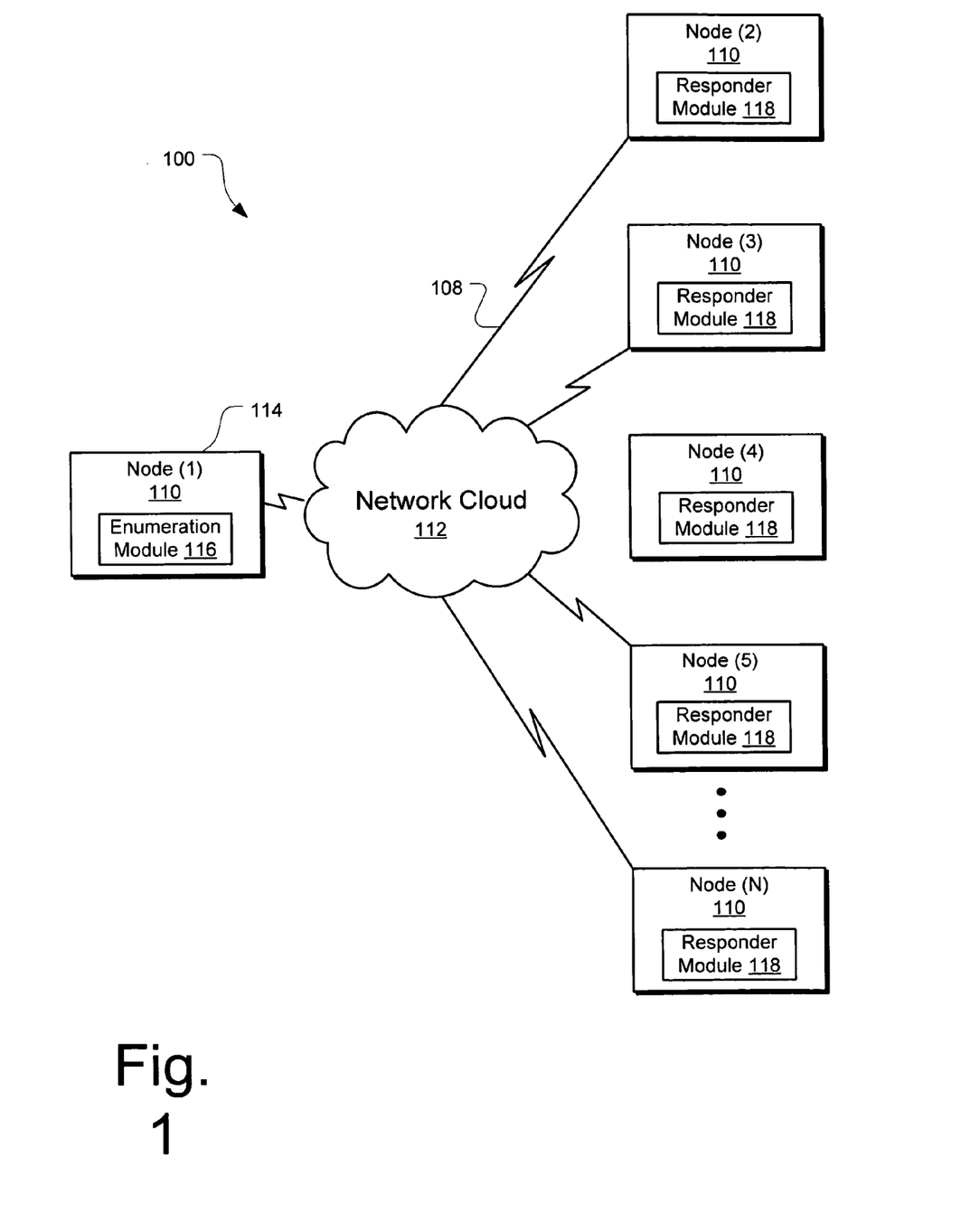
FIG. 1 is a generalized representation of computer network in which network node enumeration in accordance with the systems and methods described herein may be implemented.

Turning now to FIG. 1, shown therein is a generalized representation of computer network 100. The network 100 illustrates one possible environment in which network node enumeration may take place. The computer network 100 includes some number of nodes 110 interconnected through a network cloud 112. The variable N is used to represent an individual node's estimate of the number of accessible nodes on the network. Different nodes can have different estimates of this number, but the individual estimates are usually similar in value. In FIG. 1, an arbitrary estimate N is used.

The network cloud 112 indicates generally that data (e.g., enumeration requests and enumeration responses) may take various routes through various network paths, devices, and/or transmission mediums (e.g., wired or wireless) as the data travels between nodes 110. A jagged line between a node 10 and the network cloud 112, such as line 108, indicates that a node 10 is accessible (i.e., "on-line") in the network 100. For example, each of nodes (1), (2), (3), (5), and (N) is shown as being accessible in the network 100, while node (4) is shown as being inaccessible ("off-line") in the network 100.

As used herein, the term "node" refers to any computer system, device, or process that is uniquely addressable, or otherwise uniquely identifiable, in a network (e.g., network 100) and that is operable to communicate with other nodes in the network. For example, and without limitation, a node may be a personal computer, a server computer, a hand-held or laptop device, a tablet device, a multiprocessor system, a microprocessor-based system, a set top box, a consumer electronic device, a network PC, a minicomputer, a mainframe computer, a distributed computing environment that includes any of the above systems or devices, or the like. An example of a network node 110, in the form of a computer system 600, is set forth below with respect to FIG. 6.

In cases where a node comprises a computer system or device of some form, the node typically includes a processor and one or more forms of computer-readable media, and one or more communications connections, which allow the node to operatively connect to the network 100. As used herein, computer-readable media may be any media that can store or embody information that is encoded in a form that can be accessed and understood by a computer. Typical forms of computer-readable media include, without limitation, both volatile and nonvolatile memory, data storage devices including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

As shown, node (1) 114 includes an enumeration module 116, while nodes (2)-(N) each include a possible responder module 118. Generally, the enumeration module 116 provides node (1) 114 with various functionality to perform network node enumeration. For example, the enumeration module 116 may provide node (1) 114 with the functionality to construct enumeration requests, schedule the sending of enumeration requests, send enumeration requests, send enumeration response acknowledgments, process information contained in received enumeration responses, determine the number of accessible nodes in the network, and/or identity of accessible nodes in the network. Generally, each responder module 118 provides the node 110 in which it is included or associated with the capability to process received enumeration requests, to determine, based on some criteria and/or logic, a time at which to send an enumeration response. It should also be understood that an individual node may include both enumeration and responder modules. As used herein, the term "sending" refers generally to transmitting information, such as enumeration requests and enumeration responses, over the network 100 (e.g., broadcasting, multicasting, unicasting, etc.).

It should be understood that the functionality that is described herein with respect to a particular module might be carried out by the module itself, by the module in cooperation with the node in which the module is included or associated, or by a number of sub-modules. For example, in some implementations, the operations performed by a module are implemented as computer-executable instructions that are embodied in one or more computer-readable media. In these implementations, the operations of the module may be executed by a processor or processors in the node in which the module is included or associated. In other implementations, the operations of a module may be implemented as hardware, firmware, or some combination of hardware, firmware, and software, either as a part of, or in some other way associated with, the node in which the module is included or associated. Furthermore, the functionality that is described herein with respect to a particular module might be carried out by, or distributed across, a number of nodes.

Turning now more particularly to some specific functionality of the enumerator module 116, in one implementation, the enumeration module 116 sends a number of temporally spaced enumeration requests to responder modules 118 in the network 100. The spacing between the sent enumeration requests may be periodic or non-periodic. For example, in one implementation, enumeration requests are sent in evenly spaced time intervals, referred to herein as "request intervals." In another implementation, enumeration requests are sent out at various randomly selected times. In yet other implementations, enumeration requests are sent at times determined by the enumeration module 116 based on some other schedule, logic, and/or determinations made by the enumeration module 116.

In one implementation, enumeration requests include, among other things, information identifying (acknowledging) nodes 110 that have previously sent enumeration responses that were received by the enumeration module 116. In one implementation, each enumeration request includes information identifying nodes 110 that have sent enumeration responses received by the enumeration module in a given time frame (e.g., an enumeration session). For example, in one implementation, each enumeration request can include information (e.g., acknowledgements) identifying nodes 110 that have sent enumeration responses since the last enumeration request was sent by the enumeration module. In one implementation, enumeration requests may identify nodes 110 that have previously been acknowledged. In another implementation, the number of times a given node is acknowledged in an enumeration request may be limited or capped.

When the enumeration module 116 receives an enumeration response, information contained in the response may be stored for processing or later retrieval. For example, the enumeration module 116 may create and/or maintain one or more data structures in which the identities (e.g., network addresses) of each node that sent an enumeration response are stored. In one implementation, the enumeration module 116 maintains one data structure including the addresses of all nodes that have sent enumeration responses since the last enumeration request was sent and another data structure including the addresses of all nodes that have sent enumeration responses throughout the enumeration session. In this implementation, the data structure including the addresses of all nodes that have sent enumeration responses since the last enumeration request may then be used to construct the next enumeration request, while the data structure that including the addresses of all nodes that have sent enumeration responses throughout the enumeration session may be used for final network node enumeration. In other implementations, the enumeration module 116 compiles and/or stores various other data that are used in the enumeration session.

In some implementations, the enumeration module 116 sends enumeration requests, and receives and processes enumeration responses until a predetermined condition (e.g., a timing condition, etc.) has been met. For example, and without limitation, in one implementation, the enumeration module 116 continues to send enumeration requests until a given time period has elapsed since the last enumeration response was received by the enumeration module 116. In another implementation, the enumeration module 116 continues to send enumeration requests until the number of responses per a given time period is below some minimum value. In yet another implementation, the enumeration module 116 sends enumeration requests until the number of responses received per a given time period is below some minimum value, and then continues to send enumeration requests for an additional predetermined time period.

In one implementation, the information received from the nodes during the enumeration session is analyzed and/or compiled to produce various enumeration data. For example, the number and/or identities of all the nodes that sent enumeration responses during the enumeration session, in addition to other information, may then be determined.

Figure 2:
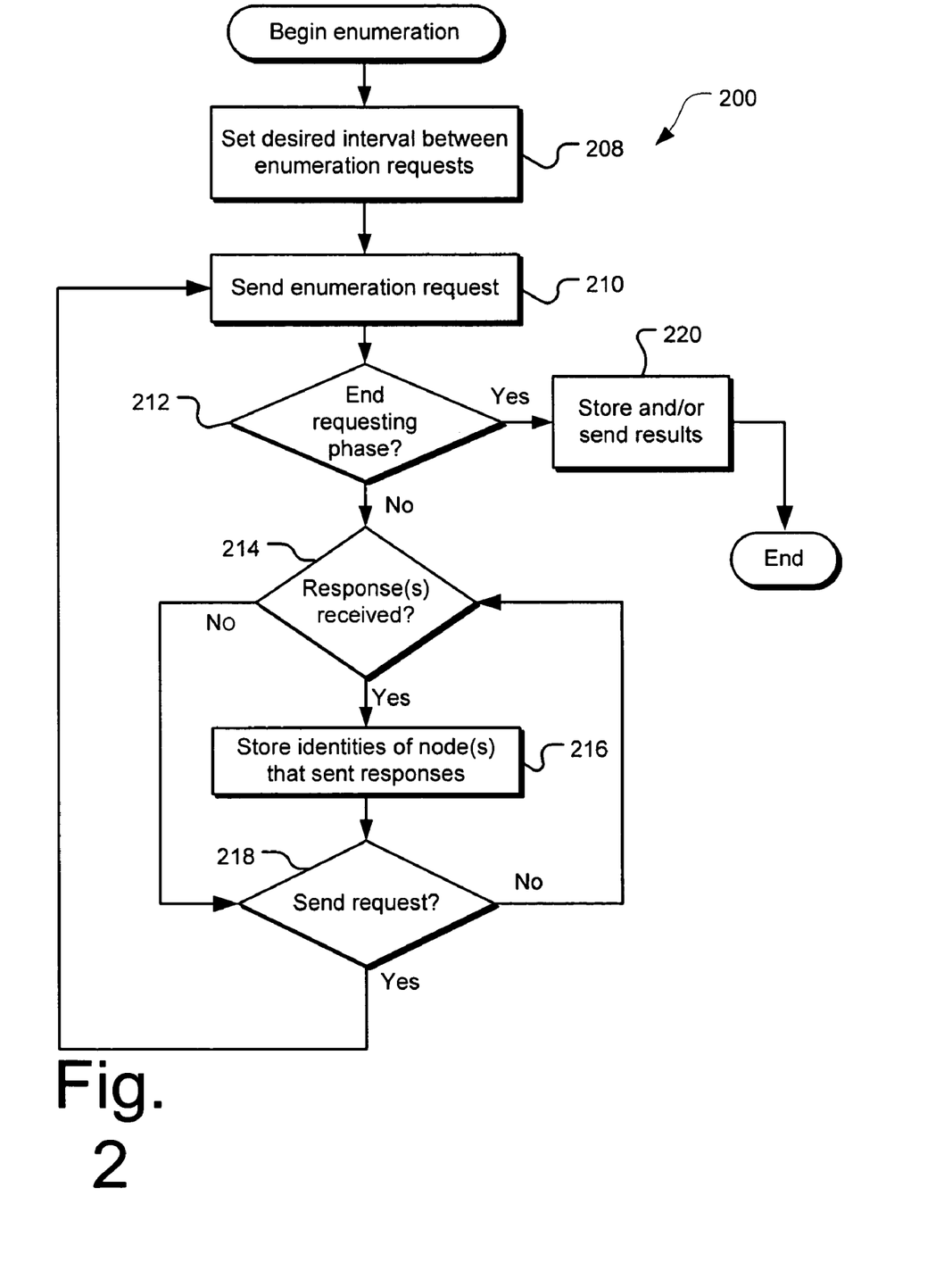
FIG. 2 illustrates an operational flow including various operations that may be performed in an enumeration session performed by an enumerator in a network, such as the network of FIG. 1.

FIG. 2 illustrates an operational flow 200 including various operations that may be performed in an enumeration session performed by an enumerator in a network. The following description of FIG. 2 is made with reference to the network 100 of FIG. 1. In particular, the description of FIG. 2 is made with reference to the enumeration module 116 and network 100 of FIG. 1. However, it should be understood that the operational flow described with respect to FIG. 2 is not intended to be limited to being performed by the enumeration module 116, or in network 100. Additionally, it should be understood that while the operational flow 200 indicates a particular order of operation execution, in other implementations the operations may be ordered differently.

The operational flow 200 illustrates, among other things, a requesting phase. The requesting phase is that portion of the enumeration session where enumeration responses are being sent to nodes in the network. The requesting phase is shown in operational flow 200 as an operational loop including operations 210-218.

As shown, at operation 208 a desired interval between enumeration requests is set. In the implementation shown in FIG. 2, operation 208 occurs once during the operational flow 200, preceding the requesting phase. In an alternative implementation, operation 208 may also occur during the requesting phase. This provides the flexibility to change the desired interval between enumeration requests during the requesting phase based on operational or network conditions or operator preference.

Next, at operation 210 an enumeration request is sent by the enumeration module 116 to nodes 110 in the network 100. The enumeration request sent in operation 210 may include, among other things, information identifying nodes 110 that have previously sent enumeration responses that were received by the enumeration module 116. That is, the enumeration request sent in operation 210 may include an acknowledgement of nodes 110 that have previously sent enumeration responses that were received by the enumeration module 116.

In one implementation, the enumeration request sent in operation 210 includes information identifying or acknowledging only those nodes 110 that have sent an enumeration response that was received by the enumeration module 116 since the last enumeration request was sent by the enumeration module 116. In other implementations, the enumeration response sent in operation 210 includes information identifying all or some of the nodes 110 that have sent an enumeration response that were received by the enumeration module 116 during the present enumeration session.

Next, it is determined at operation 212 whether the enumeration module 116 should end the requesting phase of the enumeration session. That is, a determination is made as to whether the operational loop formed by operations 210-218 should be exited. The determination made at operation 212 may be based on various factors. In some implementations, the determination made at operation 212 is made based on some criterion or criteria that indicate or suggest that all nodes that were likely to respond during the enumeration session have already responded. For example, in one implementation if a predetermined time has passed since the last enumeration response was received by the enumeration module 116, the determination is made at operation 212 to end the requesting phase of the enumeration session. In other implementations, other criteria may be used in determining whether the enumeration module 116 ends the requesting phase of the enumeration session. It should be appreciated that operation 212 may occur at points in the operational loop formed by operations 210-218 other than after operation 210.

If it is determined at operation 212 that the enumeration module 116 should end the requesting phase, the operational flow 200 continues to operation 220, described below. However, if it is not determined at operation 212 that the enumeration module 116 should end the requesting phase, the operational flow proceeds to operation 214, where a determination is made whether any enumeration responses have been received since the last enumeration request was sent by the enumeration module 116.

If it is determined at operation 214 that no enumeration responses have been received since the last enumeration request was sent by the enumeration module 116, the operational flow 200 continues to operation 218, described below. If, however, it is determined at operation 214 that one or more enumeration responses have been received since the last enumeration request was sent by the enumeration module 116, the identities of the nodes that sent the responses are stored, and the operational flow 200 continues to operation 218.

At operation 218, it is determined whether an enumeration request is to be sent. This determination may be made in various ways. For example, in one implementation, the determination is made based on whether a time period equal to the desired interval between enumeration requests, set at operation 208, has elapsed since the last enumeration request was sent by the enumeration module 116. If it is determined at operation 218 that an enumeration request is to be sent, the operational flow 200 returns to operation 210. If it is determined at operation 218 that an enumeration request is not to be sent, the operational flow returns to operation 214. It should be appreciated that operation 218 may occur at points in the requesting phase other than after operation 214.

Returning to operation 212, as noted above, if it is determined therein that the enumeration module 116 should end the requesting phase, the operational flow 200 continues to operation 220. At operation 220, data gathered during the enumeration session is compiled and sent and/or stored, and the operational flow 200 ends. Some examples of the type of data that may be compiled at operation 220 include a count and/or identification of all nodes that responded to enumeration requests sent by the enumeration module 116 within a given time period.

In some implementations, operation 220 is not located in the operational flow 200 following operation 212. That is, in some implementations, operation 220 is not carried out following a determination that the enumeration module 116 should end the requesting phase of the enumeration session. Rather, in some implementations, the task of compiling and sending data may occur at one or more points during the requesting phase, or continuously throughout the requesting phase.

Each responder module 118 monitors the network for the sending of enumeration request from the enumeration module 116. In various implementations described herein, upon detecting an enumeration request, each responder module 118 executes a response scheduling method. Generally, response scheduling methods determine if a responder module 118 will respond to an enumeration request by sending an enumeration response. If it is determined that the responder module will respond to the enumeration request, the scheduling method determines the time at which the responder module 118 will send the enumeration response.

There are a number of different types of response scheduling methods that may be employed by the responder modules 118. For example, and without limitation, FIGS. 3, 4, and 5 each illustrate a response scheduling method that may be employed by the responder modules 118. In some implementations, each responder module in the network 100 uses the same or a substantially similar response scheduling method during a given enumeration session. In other implementations, different scheduling methods may be used by various responder modules 118 in the network 100.

Figure 3:
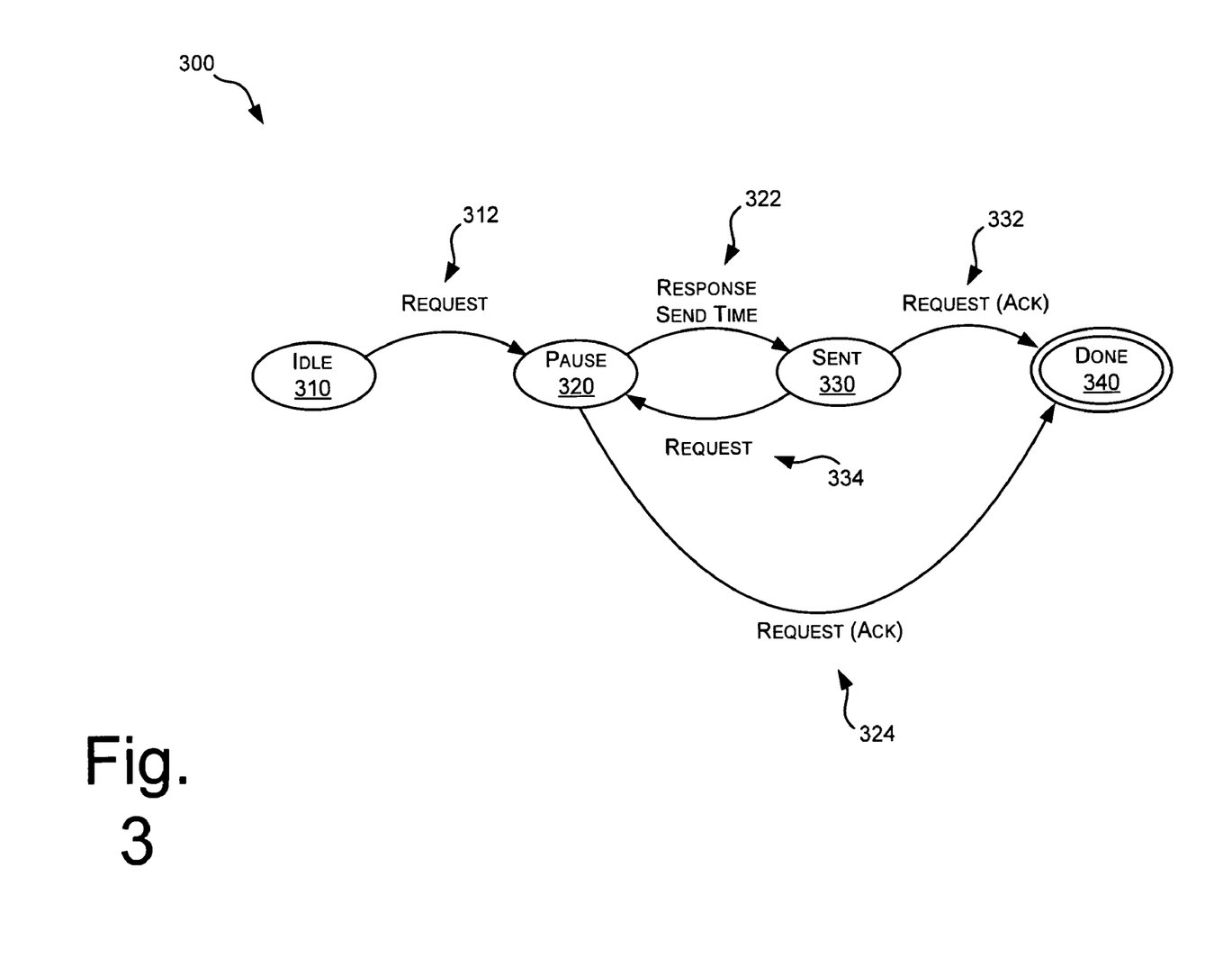
FIG. 3 is a simplified state transition diagram illustrating example states through which a responder module may transition during network enumeration.
Figure 4:
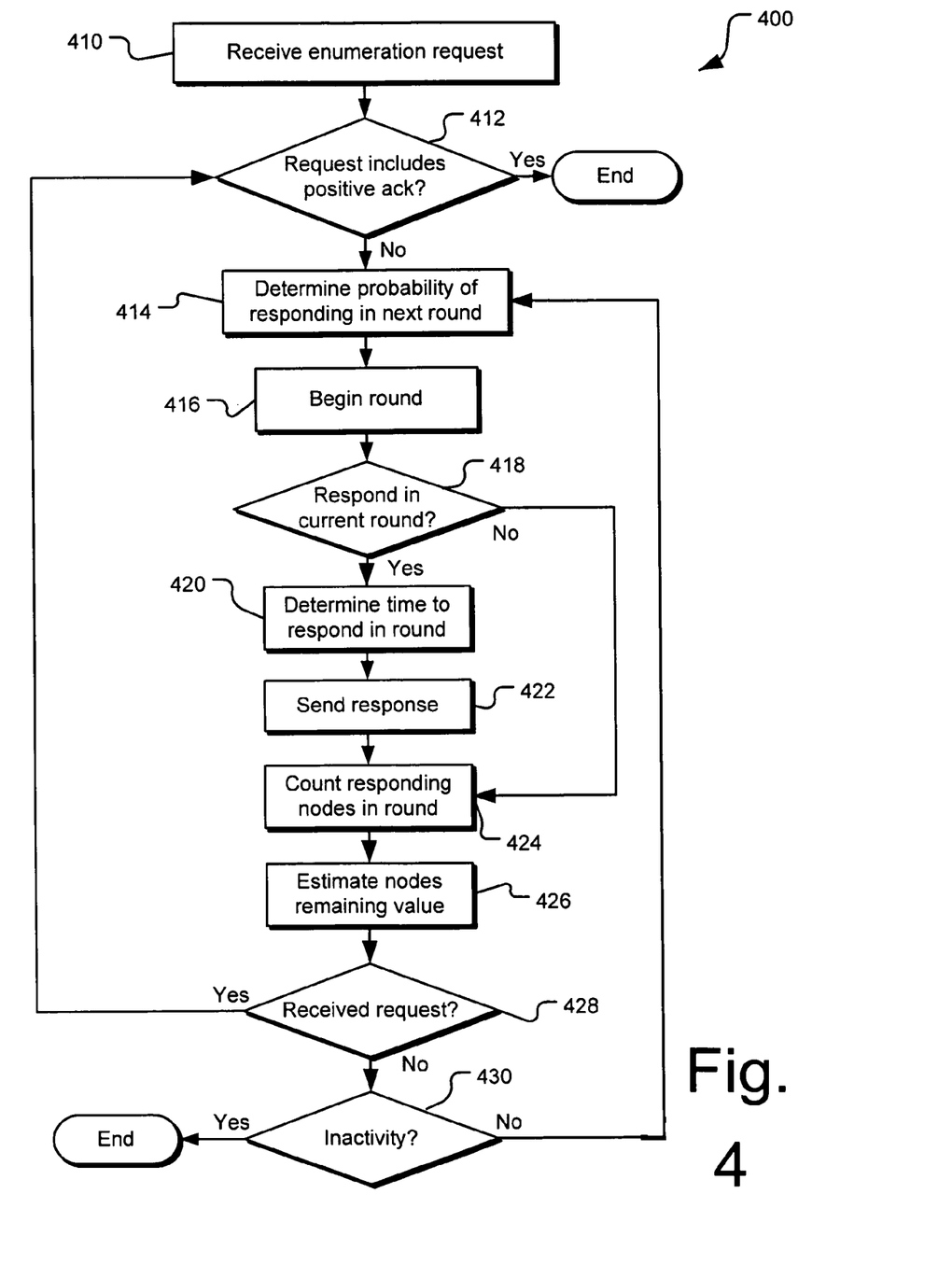
FIG. 4 illustrates an operational flow for a fixed round length scheduling method in a responder module in a network, such as the network of FIG. 1.
Figure 5:
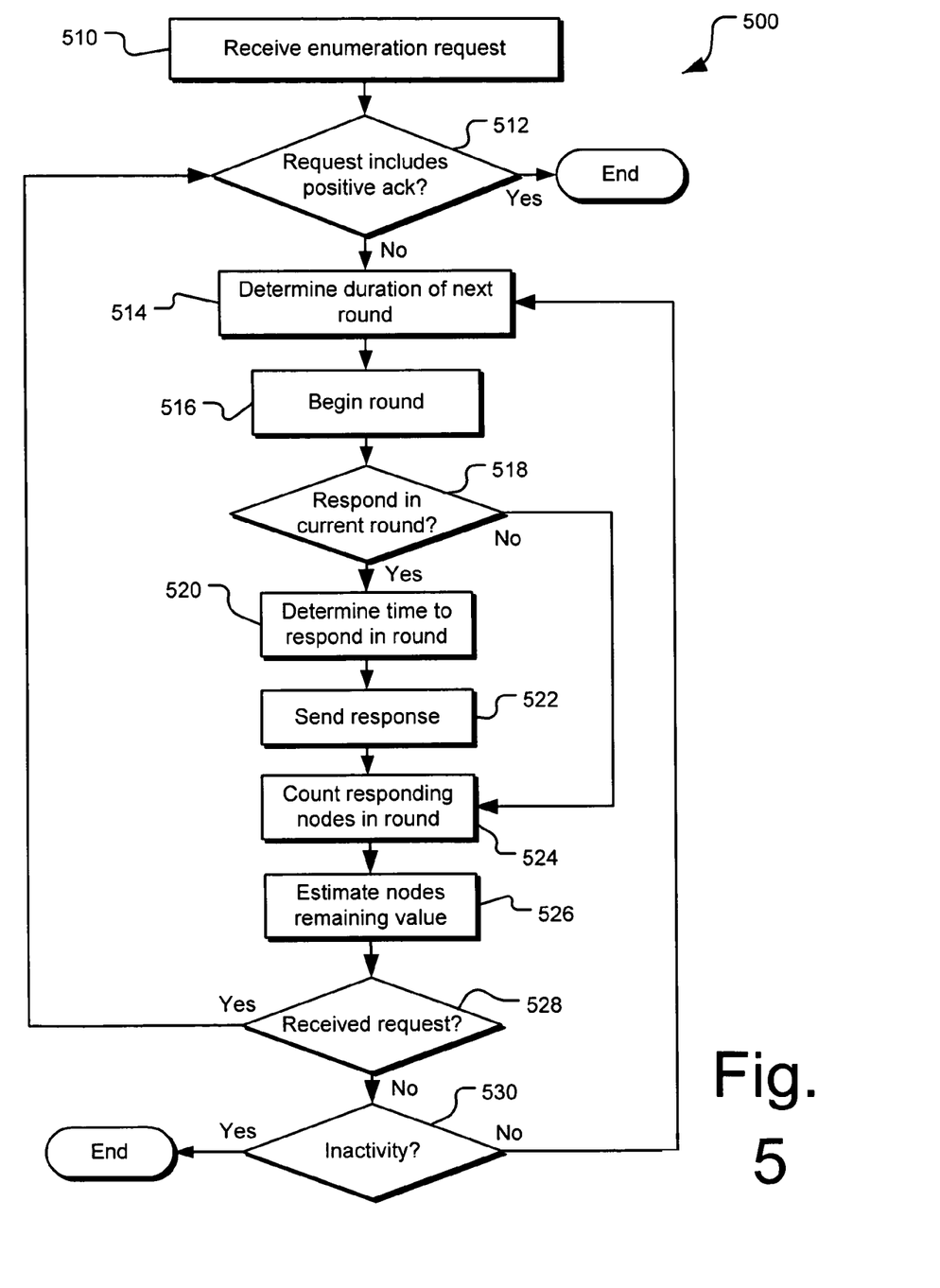
FIG. 5 illustrates an operational flow for a variable round length scheduling method in a responder module in a network, such as the network of FIG. 1.

The following descriptions of FIGS. 3, 4, and 5 are made with reference to the network 100 of FIG. 1. In particular, the descriptions of FIGS. 3, 4, and 5 are made with reference to the responder modules 118 and the enumerator module 116 of the network 100. However, it should be understood that the scheduling methods described in FIGS. 3, 4, and 5 are not intended to be limited to being performed by the responder modules 118, the enumeration module 116, or in network 100. Additionally, it should be understood that while the scheduling methods shown in FIGS. 3, 4, and 5 each indicate a particular order of operations and/or states, in other implementations the operations and/or states might be ordered differently, various shown operations and/or states may not be carried out or included, and/or other operations and/or states may be included.

Turning first to FIG. 3, shown therein is a simplified state transition diagram illustrating example states through which the responder module 118 may transition during network enumeration. As shown, the responder module 118 is initially in an idle state 310. Upon receipt of an enumeration request 312, the responder module 118 sets a response timer, determines an enumeration response send time, and transitions from the idle state 310 to a pause state 320. The enumeration response send time specifies a time, with reference to the timer, at which the responder module is to send an enumeration response to the enumerator module 116.

The responder module 118 may determine the enumeration response send time in various ways. In some implementations, the responder module 118 determines the enumeration response send time based on observations made by the responder module 118 of enumeration responses sent from other responder modules. More particularly, in these implementations, the responder modules uses these observations to set an enumeration send time using a timing method that, assuming other nodes in the network are using a similar timing method, would tend to produce a desired distribution of sent enumeration responses across the network. It should be understood that while the timing method may use the assumption that other nodes in the network are using a similar timing method, this assumption may be incorrect.

In one such implementation, the observations made by the responder module 118 relate to an average enumeration response density across the network caused by the sending of enumeration responses by other responder modules. In another such implementation, the observations made by the responder module 118 relate to a network load in terms of an amount of data sent per a given time period (e.g., bits per second) across the network due to the sending of enumeration responses by other responder modules. More particular examples of how send times may be computed are described below with respect to FIGS. 4 and 5.

Once in the pause state 320, the responder module 118 waits for either the timer to reach the response send time 322 or the receipt of an enumeration request 324 including an acknowledgment that the enumeration module 116 has received an enumeration response from the responder module 118 (a positive acknowledgement). In the case where the timer reaches the response send time 322, the responder module sends an enumeration response, either at the response send time or at another time, and transitions to a sent state 330. In the case where the responder module receives a positive acknowledgement 324, the responder module 118 transitions to a done state 340.

Once in the sent state 330, the responder module 118 waits for the receipt of an enumeration request 332 or 334. If the enumeration request does not include a positive acknowledgement 334, the responder module 118 sets a response timer, determines an enumeration response send time, and transitions from the sent state 330 to the pause state 320, as described previously. If the enumeration request includes a positive acknowledgement 332, the responder module 118 transitions from the sent state 330 to the done state 340.

In some implementations, the responder modules 118 employ "round based" scheduling methods. Round based scheduling methods schedule the sending of an enumeration response during one of a number of sequential timing rounds, which may be generally synchronized between the various responder modules in the network. In round based scheduling, the timing of the rounds is computed separately by each responder module 118. However, a general synchronization may occur between the timing rounds in the various responder modules 118 due to the common scheduling methods used in the responder modules 118, and the roughly simultaneous start time for the scheduling methods, which are triggered by an enumeration request.

Round based scheduling may be classified as either fixed round length scheduling or variable round length scheduling, although other types of round based scheduling may be employed. In fixed round length scheduling, the duration of each timing round in a given sequence of timing rounds is approximately the same. In contrast, in variable round length scheduling, the duration of each timing round in a given sequence of timing rounds may vary.

In both fixed round length scheduling and variable round length scheduling, an attempt is made to evenly distribute the sending of enumeration responses from all accessible responder modules at some desired minimum average time between enumeration responses. To accomplish this, both fixed and variable round length scheduling methods calculate a nodes remaining value ($N_r$) and a minimum interval value (I). The nodes remaining value ($N_r$) is an integer which specifies an estimate of the number of nodes that have not yet received a positive acknowledgement from the enumeration module 116. The minimum interval value (I) specifies a desired minimum average time between enumeration responses across the network, from responder modules in all accessible nodes, during the enumeration session.

In fixed round length scheduling, the values of $N_r$ and I are used to determine whether an enumeration response is sent in a given round. In variable round length scheduling, the values of $N_r$ and I are used to determine the length of the rounds.

The manner in which the nodes remaining value ($N_r$) is determined is dependant on the type of round based scheduling used. Some examples of ways in which the nodes remaining value ($N_r$) may be determined are described below with respect to FIGS. 4 and 5. The value of I may be selected empirically, or calculated based on various parameters, such as maximum network size, network transmission speeds, etc. In some implementations, I is specified in milliseconds (ms). In other implementations, I is expressed in other units of time. Once obtained, the value of I may be stored in, or otherwise made accessible to, all of the responder modules 118 in the network.

FIGS. 4 and 5 each illustrate an operational flow for one possible implementation of a scheduling method. The following discussion with respect to FIGS. 4 and 5 are made with respect to a single responder module 118 in response to a single enumeration request. It should be understood that the operation flows shown in FIGS. 4 and 5 may take place in the responder module 118 each time enumeration requests are received by the responder modules 118. Furthermore, it should be understood that the same or similar operational flows as those shown in FIGS. 4 and 5 would typically take place in each accessible responder module 118 in the network 100 during an enumeration session.

FIG. 4 illustrates one possible operational flow 400 for a fixed round length scheduling method in a responder module 118. In some implementations, the scheduling method illustrated by operation flow 400 is performed by the responder module 118 each time an enumeration request is received by the responder module. In other implementations, the scheduling method illustrated by operation flow 400 is performed by the responder module 118 only at specified times. That is, in some implementations, the scheduling method illustrated by operation flow 400 is "turned on" or "turned off" based on various operational conditions or user needs.

In some implementations, at some time prior to performance of the operational flow 400 in the responder module, a timing round duration value ($t_d$) is determined that specifies the duration of the timing rounds used in the fixed round length scheduling method. The value of $t_d$ may be selected empirically, or calculated based on various parameters, such as maximum network size, network transmission speeds, etc. In some implementations, $t_d$ is an integer value that indicates the duration of the timing rounds in milliseconds (ms). In other implementations, $t_d$ is expressed in other units of time. Once obtained, the value of $t_d$ is stored in, or otherwise made accessible to, all of the responder modules 118 in the network.

In many implementations, the value $t_d$ is determined before the start of the enumeration session. In most implementations, the value $t_d$ remains constant throughout the scheduling method. In some implementations, the value $t_d$ has a first value for the first timing round in the scheduling method and is adjusted to a second value for the remaining timing rounds in the scheduling method, based on such factors as the observed process load.

At operation 410, an enumeration request is received by the responder module 118. The receiving of the enumeration request begins, or "triggers," the scheduling method in the responder module 118. At operation 412, a determination is made whether the received enumeration request includes an indication that an enumeration response has already been received by the enumeration module 116 from the responder module 118 (a "positive acknowledgement"). For example, the responder module may have sent an enumeration response in a reply to an enumeration request sent at an earlier time in the enumeration session.

If it is determined at operation 412 that the received enumeration request includes a positive acknowledgement, the operational flow 400 ends. If, however, it is determined at operation 412 that the received enumeration request does not include a positive acknowledgement, a determination is made at operation 414 of a probability value ($\phi$) that specifies the probability that an enumeration response will be sent in the next timing round in a sequence of timing rounds occurring during the operational flow 400.

The probability value ($\phi$) may be selected or determined in various ways. For example, in one implementation the value $\phi$ is determined based on an estimate of the number of responder modules that have yet to send an enumeration response to the enumeration module 116. In one implementation, $\phi$ is determined according to the following:

$$\phi = \frac{t_d}{N_r \times I} \qquad \text{Equation (1)}$$

The first time operation 414 is performed, the value of $N_r$ is initially set to a maximum node value ($N_{max}$), which represents an estimate of the maximum number of accessible nodes in the network 100. Each successive time in the operational flow that operation 414 is performed, $N_r$ is then determined based on observed responses sent from other responder modules, as described in detail below.

Next, a timing round operation 416 begins a timing round of duration $t_d$. Substantially simultaneously with the start of the timing round, it is determined at a scheduling operation 418 if an enumeration response is to be sent by the responder module 118 during the timing round. This determination is made with a probability $\phi$, as determined in operation 414. That is, some mechanism or algorithm is used to select whether an enumeration response will be sent during the present round with a probability $\phi$.

If it is determined at operation 418 that an enumeration response is not to be sent during the current timing round, the operational flow 400 proceeds to operation 424, described below. However, if it is determined at operation 418 that an enumeration response is to be sent during the current timing round, the precise time during the round at which the enumeration response is to be sent is then made at operation 420. In one implementation, the time during the round at which the enumeration response is to be sent is selected randomly over the duration of the round. In other implementations, the time during the round at which the enumeration response is to be sent may be selected in other ways. Following operation 420, an enumeration response is sent at operation 422 at the time determined during operation 420.

Following operation 422, a count (r) is made at operation 424 of all nodes that sent an enumeration response during the current timing round. In one implementation, the count (r) is made by the responder module by monitoring the network and counting the number of enumeration responses that are sent in the network during the current timing round. It should be appreciated that while operation 424 is shown as occurring following operation 422, in operation, the count of enumeration responses sent in the network during the current timing round would typically occur throughout all or most of the timing round.

Next, the operational flow 400 proceeds to operation 426 where the nodes remaining value ($N_r$) is estimated. In general, $N_r$ is estimated based on observed responses sent from other responder modules. For example, in one implementation the nodes remaining value ($N_r$) is calculated according to the following:

$$N_r = \frac{N_{previous} \times r \times I}{t_d} - r \quad \text{Equation (2)}$$

The first time in the operational flow 400 that operation 426 is performed, the value of $N_{previous}$ is the same as $N_{max}$. Each subsequent time that operation 426 is performed in the operational flow 400, the value of $N_{previous}$ will be the value of $N_r$ calculated the last time in the flow 400 that operation 426 was performed.

In some implementations, the calculated value of $N_r$ may have an upper bound ($N_{UB}$) and/or lower bound $N_{LB}$. The values of $N_{UB}$ and $N_{LB}$ may be selected in various ways. For example, and without limitation, these values may be predetermined fixed values, they may be calculated during the operational flow 400, they may be based on various observed node or network behavior, and/or they may be percentages of previous or current calculated values of $N_r$.

Additionally, in some implementations, rather than using the value ($t_d$) at operation 426 in estimating or calculating $N_r$, the actual duration of the timing rounds is measured ($t_{actual}$) and the measured value $t_{actual}$ is then used in estimating or calculating $N_r$. For example, the value $t_{actual}$ would be used instead of the value $t_d$ in Equation (2) shown above.

Next, a determination is made at operation 428 whether an enumeration request has been received during the current timing round. If it is determined that a request has been received during the current timing round, the operational flow returns to operation 412, described above. If it is determined that a request has not been received during the current timing round, the operational flow proceeds to operation 430, where a determination is made whether an inactivity condition has been met.

The inactivity condition may be selected and/or determined in a number of ways. For example, in one implementation, the inactivity condition is met if a given time has passed since the receipt of an enumeration request. If it is determined at operation 430 the inactivity condition has been met, the operational flow ends. However, if it is determined at operation 430 that determination the inactivity condition has not been met, the operational flow returns to operation 414, as previously described.

As described, the operational flow 400 will end when either an enumeration response including a positive acknowledgement is received (operation 412) or if an inactivity condition has been met (operation 430). In addition, in some implementations, at any point in the operational flow where an enumeration request is received, a determination is made whether the request includes a positive acknowledgment. If it is determined that the received request does not include a positive acknowledgment, the operational flow continues. For example, if a request is received following operation 416, but before operation 418, which does not include a positive acknowledgement, the operational flow would continue to operation 418. If it is determined that the received request does include a positive acknowledgment, the operational flow ends.

In one implementation, a count is kept by the responder module of the total number (TR) of observed enumeration responses sent from other responder modules during since the beginning of the operational loop 400. In accordance with this implementation, each time an enumeration request is received by the responder module, the value ($TR_{mb}$) of TR at the time the request was received is stored. That is, a value $TR_{mb}$ is stored for each request received. At the end of a given round i, the most current value of $TR_{mb}$ is compared with the value $TR_{mb}$ at the end of the previous timing round. If the most current value of $TR_{mb}$ is greater than the value $TR_{mb}$ at the end of the previous timing round, the difference ($TR_{diff}$) between the most current value of $TR_{mb}$ and the value $TR_{mb}$ at the end of the previous timing round is added to the value $N_r$ determined at operation 426 of the operational flow 400, as expressed in the following:

$$N_r = \frac{N_{previous} \times r \times I}{t_d} - r + TR_{diff} \quad \text{Equation (3)}$$

FIG. 5 illustrates one possible operational flow 500 for a variable round length scheduling method in a responder module 118. In some implementations, the scheduling method illustrated by operation flow 500 is performed by the responder module 118 each time an enumeration request is received by the responder module. In other implementations, the scheduling method illustrated by operation flow 500 is performed by the responder module 118 only at specified times. That is, in some implementations, the scheduling method illustrated by operation flow 500 is "turned on" or "turned off" based on various operational conditions or user needs.

At some time prior to performance of the operational flow 500 in the responder module, a transmission probability value ($\phi$) and/or an initial timing round duration value ($t_{initial}$) are determined. The transmission probability value ($\phi$) specifies a probability that a response will be issued in timing round. The initial timing round duration value ($t_{initial}$) specifies the duration of the first timing round of the variable round length scheduling method.

The values of $\phi$ and $t_{initial}$ may be selected empirically, or calculated based on various parameters, such as maximum network size, network transmission speeds, etc. Once obtained, the values of $\phi$ and $t_{initial}$ are stored in, or otherwise made accessible to, all of the responder modules 118 in the network.

In many implementations, the value $\phi$ is determined before the start of the enumeration session. In most implementations, the value $\phi$ remains constant throughout the scheduling method. In some implementations, the value $\phi$ has a first value for the first timing round in the scheduling method and is adjusted to a second value for the remaining timing rounds in the scheduling method, based on such factors as the observed process load.

In one implementation, the value of $t_{initial}$ is determined as follows. First, a maximum node value ($N_{max}$) is determined, which represents an estimate of the maximum number of accessible nodes in the network 100. The initial timing round duration value ($t_{initial}$) is then determined according to the following:

$$t_{initial} = \phi \times N_{max} \times I \quad \text{Equation (4)}$$

At operation 510, an enumeration request is received by the responder module 118. The receiving of the enumeration request begins, or "triggers," the scheduling method in the responder module 118. At operation 512, a determination is made whether the received enumeration request includes an indication that an enumeration response has already been received by the enumeration module 116 from the responder module 118 (a "positive acknowledgement"). For example, the responder module may have sent an enumeration response in a reply to an enumeration request sent at an earlier time in the enumeration session.

If it is determined at operation 512 that the received enumeration request includes a positive acknowledgement, the operational flow 500 ends. If, however, it is determined at operation 512 that the received enumeration request does not include a positive acknowledgement, a duration of the next timing round (T) is then determined at operation 514. The first time that operation 514 is performed, T is equal to $t_{initial}$. Each successive time in the operational flow that operation 514 is performed, T is determined based on observed responses sent from other responder modules. For example, in one implementation the value of T is calculated such that enumeration responses will be evenly distributed over the next timing round according to the following:

$$T = \phi \times N_r \times I \quad \text{Equation (5)}$$

Next, a timing round operation 516 begins a timing round of duration T. Substantially simultaneously with the start of the timing round, it is determined at a scheduling operation 518 if an enumeration response is to be sent by the responder module 118 during the timing round. This determination is made with a probability $\phi$, described above. That is, some mechanism or algorithm is used to select whether an enumeration response will be sent during the present round with a probability $\phi$.

In one implementation, a responder has a minimum value of T with which it operates. This may be specified either directly in units of time as $T_{min}$, or indirectly as the number of nodes $N_{min}$. In such an implementation if T were to be less than $T_{min}$ (or $N_r$ were less than $N_{min}$), the duration of the timing round is set to $T_{min}$ and the probability is set to one.

If it is determined at operation 518 that an enumeration response is not to be sent during the current timing round, the operational flow 500 proceeds to operation 524, described below. However, if it is determined at operation 518 that an enumeration response is to be sent during the current timing round, the precise time during the round at which the enumeration response is to be sent is then made at operation 520. In one implementation, the time during the round at which the enumeration response is to be sent is selected randomly over the duration of the round. In other implementations, the time during the round at which the enumeration response is to be sent may be selected in other ways. Following operation 520, an enumeration response is sent at operation 522 at the time determined during operation 520.

Following operation 522, a count (r) is made at operation 524 of all nodes that send an enumeration response during the current timing round. In one implementation, the count (r) is made by the responder module by monitoring the network and counting the number of enumeration response that are sent in the network during the current timing round. It should be appreciated that while operation 524 is shown as occurring following operation 522, in operation, the count of enumeration response sent in the network during the current timing round would typically occur throughout all or most of the timing round.

Next, the operational flow 500 proceeds to operation 526 where the nodes remaining value ($N_r$) is estimated. In general, $N_r$ is estimated based on observed responses sent from other responder modules. It can be estimated that the number of responder modules that had yet to respond to the enumeration request at the beginning of the current round ($N_{current}$) was approximately $$N_{current} = \frac{r}{\phi}.$$

Using this estimation for $N_{current}$, the node remaining value ($N_r$) can then be estimated as follows:

$$N_r = N_{current} - r \approx \frac{r}{\phi} - r \quad \text{Equation (6)}$$

Next, a determination is made at operation 528 whether an enumeration request has been received during the current timing round. If it is determined that a request has been received during the current timing round, the operational flow returns to operation 512, described above. If it is determined that a request has not been received during the current timing round, the operational flow proceeds to operation 530, where a determination is made whether an inactivity condition has been met.

The inactivity condition may be selected and/or determined in a number of ways. For example, in one implementation, the inactivity condition is met if a given time has passed since the receipt of an enumeration request. If it is determined at operation 530 the inactivity condition has been met, the operational flow ends. However, if it is determined at operation 530 that determination the inactivity condition has not been met, the operational flow returns to operation 514, as previously described.

As described, the operational flow 500 will end when either an enumeration response including a positive acknowledgement is received (operation 512) or if an inactivity condition has been met (operation 530). In addition, in some implementations, at any point in the operational flow where an enumeration request is received, a determination is made whether the request includes a positive acknowledgment. If it is determined that the received request does not include a positive acknowledgment, the operational flow continues. For example, if a request is received following operation 516, but before operation 518, which does not include a positive acknowledgement, the operational flow would continue to operation 518. If it is determined that the received request does include a positive acknowledgment, the operational flow ends.

In the various timing methods described above, a responder module 118 will typically send enumeration responses each time an enumeration request is received. As also described, in various implementations a responder module will typically monitor the network 100 and count the number of enumeration responses that are sent during a given time period. This count is then used to estimate a number of responder modules $N_r$ that have yet to respond to an enumeration request. However, in some implementations, the responder module may reduce the load put on the network by sending responses out to the network as a whole (broadcasting) with a given probability z, and sending directed responses (unicast) to the enumerator module 116 with a probability of (1−z). In such implementations, it may still be possible to estimate $N_r$ by dividing the observed number of responses by z.

Figure 6:
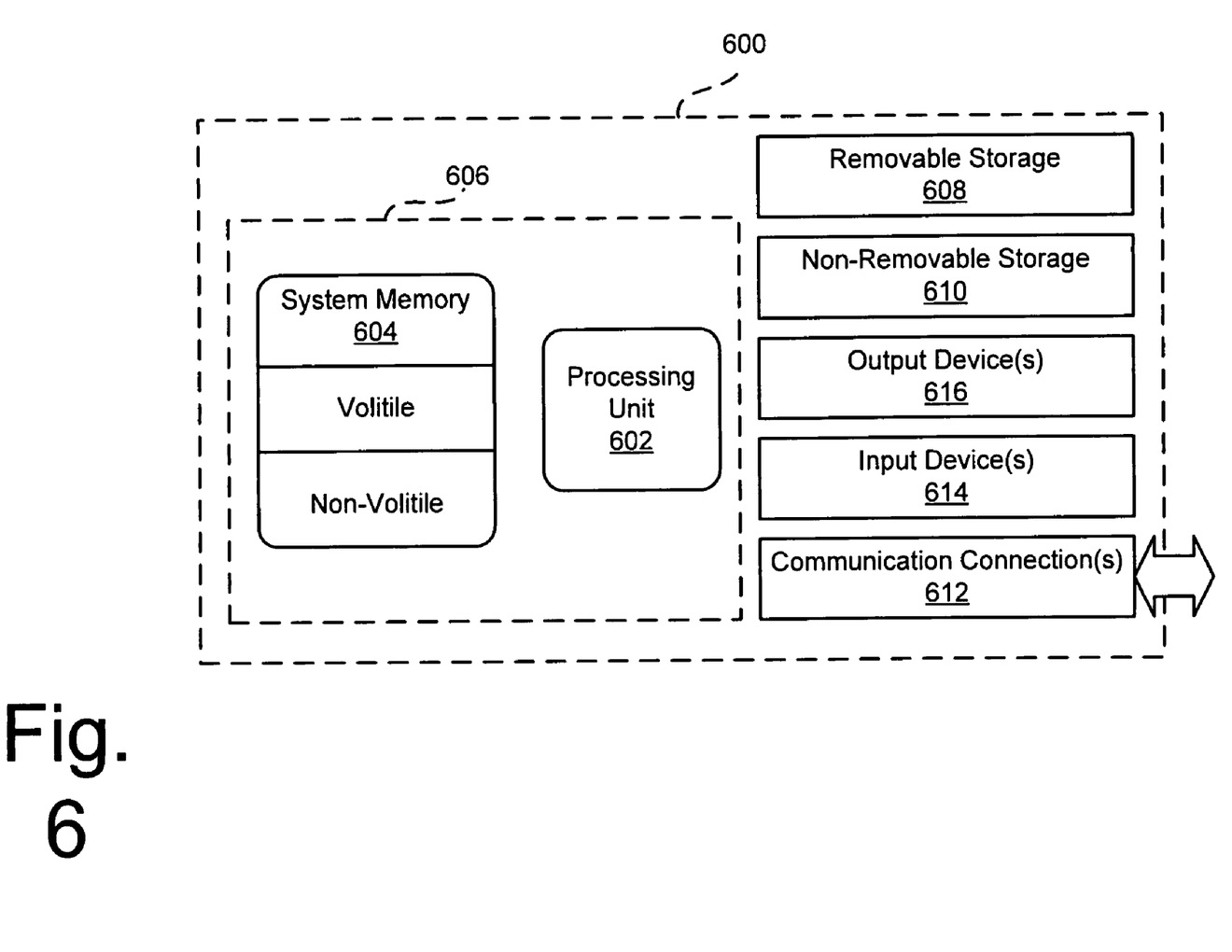
FIG. 6 illustrates an example network node in the form of a computer system.

FIG. 6 illustrates an example network node 110, in the form of a computer system 600. In its most basic configuration, computing system 600 includes at least one processing unit 602 and memory 604. Depending on the exact configuration and type of computing device, memory 604 may be volatile (such as RAM), non-volatile (such as ROM, flash memory, etc.), or some combination of the two. This most basic configuration is illustrated in FIG. 6 by dashed line 606. Additionally, computer system 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610.

Computer system 600 may also contain communications connection(s) 612 that allow the device to communicate with other devices. Computer system 600 may also have input device(s) 614 such as keyboard, mouse, pen, voice input device, touch input device, etc. Output device(s) 616 such as a display, speakers, printer, etc. may also be included in computer system 600. All these devices are well known in the art and need not be discussed at length here.

In an exemplary implementation, an enumerator module, a responder module, and other modules may be embodied by instructions stored in memory 604 and/or storage devices 608 and 610 and processed by the processing unit 602. Session state tables and records, discovery states, acknowledgments, enumeration requests, enumeration responses, and other data may be stored in memory 404 and/or storage devices 608 and 610.

As discussed, a network node discovery process can be influenced by specific characteristics of a network. Therefore, in one implementation, a network node enumeration may be tuned by considering such network-specific characteristics. The parameters $N_r$ and I can influence the network load during enumeration, where $N_r$ represents an estimate of the nodes remaining to respond to an enumeration request, and I represents a target mean packet inter-arrival interval, which sets a target network load. Both parameters can be used to determine a probability of sending an enumeration response in a given round (e.g., see Equation (1) pertaining to fixed round length scheduling) and to determine the length of a given round (e.g., see Equation (4) pertaining to variable round length scheduling) that influences network load during enumeration. As each parameter increases, the probability of response decreases or the duration of the round increases to approximately maintain the target load. Such parameters may also be used in other enumeration response scheduling algorithms.

As described herein, a timing round duration, such as $t_d$ or T, can be a relevant factor in scheduling enumeration responses and therefore in approximating a target network load. A small timing round duration permits the system to be more responsive. However, if the timing round duration is too small, then the system is over-sensitive to the natural variance of the random number generators in each of the network nodes. To consider the effects of the timing round duration, a unitless constant α is defined according the constraint $t_d = \alpha \cdot I$, wherein α represents the number of packet intervals per timing round.

The packet interval (I) is influenced by an expected packet size (P) and the network capacity (C). In one implementation, the packet interval may be computed as follows:

$$I = \frac{P}{(\lambda \cdot C)} \qquad \text{Equation (7)}$$

where λ represents a maximum fraction (e.g., between 0 and 1) of the network capacity C allocated for use by network enumeration traffic. Because it is possible that a partitioned network can be rejoined in the middle of an enumeration, a reasonable choice of λ is 0.5, although other choices of λ may also be used, particularly those less than 0.5.

In one implementation, the nodes remaining value ($N_r$) is recomputed for each round. Depending on the nature of the network, the value $N_r$ in any computation may tend toward some catastrophic extremes. For example, if $N_r$ gets too small, the response frequency can grow to drive the network load over the target. Likewise, if $N_r$ gets too large, the response frequency can dwindle to unacceptably slow or preclude completion of enumeration of a given responder node. Therefore, as previously discussed, upper and/or lower bounds may be applied to the $N_r$ computations to limit these extremes.

A network-specific lower bound may be determined by considering the effects of dead time (e.g., due to clock latency, device driver bug, etc.) on the network load. Certain considerations are made, in no particular order of importance:

1. Clock jitter on the responder nodes is assumed (e.g., up to 100 ms in a given network)
2. Device driver bugs cause periods in which no packets are received by a responder node (observed up to 100 ms in a given network)
3. The initial enumeration request from an enumerator can be lost between two different portions of a network and the subsequent request (first acknowledgement) packet can trigger a large number of other network nodes to begin responding at a point which appears to be the middle of an enumeration to those nodes that did receive the first enumeration packet.
4. On a large network, an attacker could initiate an enumeration and then flood the network for one round. The responders would see no other responses during this round and therefore set their estimator $N_i$ to a very small number. After the first (flooded) round, the responders would prolong the flood by sending their own responses quickly over a short interval.

In light of items (1) and (2) above, a dead time metric ("deadTime") of 100 ms, for example, is assumed. In light of items (3) and (4), a temporary tolerable overload is anticipated, a maximum value of which is assumed subject to the constraint β·λ<1. In one implementation, unitless dead time parameter (γ) is set to γ=deadTime/I. In one implementation, the damping factor is related to the timing round duration (e.g., $t_d$ or T) through the parameter (α) representing the number of packet intervals per timing round.

In the load control loop, which computes $N_r$ in each timing round, the estimate of the number of remaining active nodes is bound by an assumption that enumeration responses were transmitted by other nodes at the packet interval rate but not received on the responder node of interest during a time equal to the dead time metric. In one example, $N_{LB}$ is computed by the following:

$$N_{LB}[N_iD] \quad \text{Equation (8)}$$

where D is a damping factor:

$$D = \frac{\gamma}{\beta\alpha} \quad \text{Equation (9)}$$

and γ represents a damping parameter incorporating a dead time contribution; β represents a maximum tolerable network overload; α represents the number of packet intervals per timing round or a number of enumeration responses expected to be observed during a round. A value of α is generally selected from the range of 40 to 50, although values outside this range are possible under certain conditions.

In one example, consider a computer network, which may include IEEE 802.11 wireless segments, with a standard maximum packet size P of 1500 bytes and a maximum fraction of network capacity λ of 0.5. A resulting packet interval I is computed to be 25.6 ms. A beta value is computed to be at most 2, and a gamma value is computed to be 3.90625. An alpha value of 43 gives a block time of 1100 ms. Therefore, the damping factor in this example is:

$$D = \frac{3.90625}{2 \cdot 43} \approx \frac{1}{22} \quad \text{Equation (10)}$$

Therefore, in one implementation of network node enumeration, the estimate of the nodes remaining ($N_r$) in a given round i can computed using the following algorithm:

$$N_{i+1} = \max\left(\lceil N_i D \rceil, \min\left(100N_{max}, \frac{r_i N_i I}{T_a}\right)\right) \quad \text{Equation (11)}$$

wherein $N_i$ represents the current-round estimate of the number of active nodes remaining in the network; $N_{i+1}$ represents the subsequent-round estimate of the number of active nodes remaining in the network; $r_i$ represents a count of all nodes that sent an enumeration response in the round i, I represents the packet interval, and $T_a$ represents the actual timing round duration. The value 100 $N_{max}$ represents an upper bound.

Figure 7:
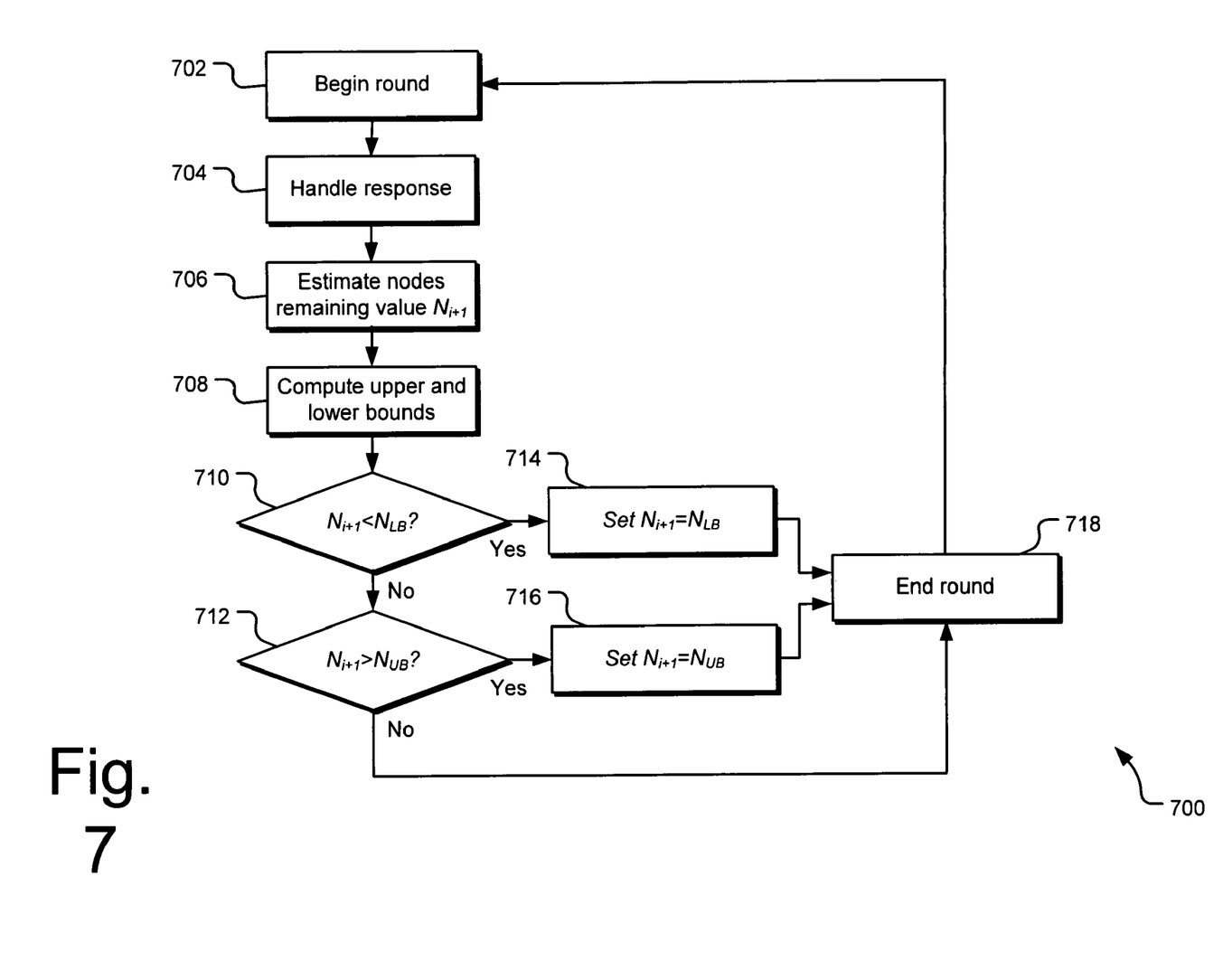
FIG. 7 illustrates exemplary operations for computing a nodes remaining value estimate for a subsequent round.

FIG. 7 illustrates exemplary operations for computing a nodes remaining estimate for a subsequent round. In initial operation 702, a new round i+1 is started. A response operation 704 handles responding to an enumeration request (e.g., by computing a response probability for the round and transmitting a response, if appropriate). An estimation operation 706 estimates the nodes remaining value $N_{i+1}$ without application of any bounds. In one implementation, the unbounded $N_{i+1}$ is computed as:

$$N_{i+1} = \frac{r_i N_i I}{T_a} \quad \text{Equation (12)}$$

A bounding operation 708 computes an upper and lower bound for the nodes remaining estimate. In one implementation, the upper bound ($N_{UB}$) is set to some sufficiently high value (e.g., 100 $N_{max}$) to ensure that some enumeration responses are transmitted by the responder node. Likewise, in one implementation, the lower bound ($N_{LB}$) is computed based on a dead time parameter γ. For example, the lower bound may be computed as:

$$N_{LB} = \left\lceil \frac{\gamma N_i}{\beta\alpha} \right\rceil \quad \text{Equation (13)}$$

Other computations for the upper and lower bounds on the nodes remaining estimate are also contemplated.

A decision operation 710 determines whether the estimate $N_{i+1}$ is less than the lower bound $N_{LB}$. If so, a setting operation 714 sets $N_{i+1}=N_{LB}$. Otherwise, another decision operation 712 determines whether the estimate $N_{i+1}$ is greater than the upper bound $N_{UB}$. If so, a setting operation 716 sets $N_{i+1}=N_{UB}$. After completion of decision operation 712, setting operation 714, or setting operation 716, then an ending operation 718 completes the round and returns to initial operation 702, if appropriate.

Although some particular implementations of systems and methods have been illustrated in the accompanying drawings and described in the foregoing Detailed Description, it will be understood that the systems and methods shown and described are not limited to the particular implementations described, but are capable of numerous rearrangements, modifications and substitutions without departing from the spirit set forth and defined by the following claims.

What is claimed is:

1. A method of managing enumeration traffic in a computer network, the method comprising:
   receiving an enumeration request from one of the plurality of enumerators;
   maintaining a session state table by the network node having a session state record for each of the plurality of enumerators;
   if the enumeration request does not include an acknowledgement of a previous enumeration response by the network node and if the session state record for each of the plurality of enumerators indicate that the plurality of enumerators have not acknowledged a previous enumeration response by the network node;
   computing a damping factor based on a timing round duration associated with the computer network;
   computing an estimate of active nodes remaining to respond to an enumeration request in the computer network, wherein the estimate is bounded by a lower bound based on the damping factor;
   determining a probability an enumeration response will be sent by another network node in a timing round based on the estimate;
   determining whether an enumeration is to be sent by the network node in the timing round based on the probability an enumeration response will be sent by another network node in the timing round, and, if the enumeration response is to be sent by the network node in the timing round, determining a time to send the enumeration response, and, scheduling transmission of the enumeration response at the determined time; and
   receiving an acknowledgement of the one or more enumeration responses from one of the plurality of enumerators; and
   transitioning the session state record with the enumerator to a new state, responsive to receipt of the acknowledgement from the enumerator, wherein the new state indicates that the network has received an acknowledgement from the enumerator.

2. The method of claim 1 wherein the operation of computing a damping factor comprises:
computing the damping factor as a function of an amount of network overload tolerable in the computer network.

3. The method of claim 1 wherein the operation of computing a damping factor comprises:
computing the damping factor as a function of a dead time metric associated with the computer network.

4. The method of claim 1 wherein the operation of computing a damping factor comprises:
computing the damping factor as a function of a packet interval associated with the computer network.

5. The method of claim 1 wherein the operation of computing an estimate of active nodes remaining to respond to an enumeration request in the computer network comprises:
computing an unbounded estimate of active nodes remaining to respond to the enumeration request as a function of a packet interval in the computer network; and
applying the lower bound to obtain the estimate.

6. The method of claim 1 wherein the operation of computing an estimate of active nodes remaining to respond to an enumeration request in the computer network comprises:
computing an unbounded estimate of active nodes remaining to respond to the enumeration request as a function of a timing round duration in the computer network; and
applying the lower bound to obtain the estimate.

7. The method of claim 1 wherein the operation of computing an estimate of active nodes remaining to respond to an enumeration request in the computer network comprises:
computing the estimate of active nodes remaining to respond to the enumeration request in a current round as a function of a previously computed estimate of active nodes remaining to respond to the enumeration request in a previous round.

8. The method of claim 1 wherein the operation of computing an estimate of active nodes remaining to respond to an enumeration request in the computer network comprises:
computing the estimate of active nodes remaining to respond to the enumeration request in a current round as a function of a count of all nodes that sent an enumeration response in a previous round.

9. Computer-readable media having computer-executable instructions for performing a method comprising:
receiving an enumeration request from one of the plurality of enumerators;
maintaining a session state table by the network node having a session state record for each of the plurality of enumerators;
if the enumeration request does not include an acknowledgement of a previous enumeration response by the network node and if the session state record for each of the plurality of enumerators indicate that the plurality of enumerators have not acknowledged a previous enumeration response by the network node;
computing a damping factor based on a timing round duration associated with the computer network;
computing an estimate of active nodes remaining to respond to an enumeration request in the computer network, wherein the estimate is bounded by a lower bound based on the damping factor;
determining a probability an enumeration response will be sent by another network node in a timing round based on the estimate;
determining whether an enumeration is to be sent by the network node in the timing round based on the probability an enumeration response will be sent by another network node in the timing round, and, if the enumeration response is to be sent by the network node in the timing round, determining a time to send the enumeration response, and, scheduling transmission of the enumeration response at the determined time; and
receiving an acknowledgement of the one or more enumeration responses from one of the plurality of enumerators; and
transitioning the session state record with the enumerator to a new state, responsive to receipt of the acknowledgement from the enumerator, wherein the new state indicates that the network has received an acknowledgement from the enumerator,
wherein the computer-readable media does not comprise a transitory data signal.

10. The computer-readable media of claim 9, wherein the operation of computing a damping factor comprises:
computing the damping factor as a function of an amount of network overload tolerable in the computer network.

11. The computer-readable media of claim 9, wherein the operation of computing a damping factor comprises:
computing the damping factor as a function of a dead time metric associated with the computer network.

12. The computer-readable media of claim 9, wherein the operation of computing a damping factor comprises:
computing the damping factor as a function of a packet interval associated with the computer network.

13. The computer-readable media of claim 9, wherein the operation of computing an estimate of active nodes remaining to respond to an enumeration request in the computer network comprises:
computing an unbounded estimate of active nodes remaining to respond to the enumeration request as a function of a packet interval in the computer network; and
applying the lower bound to obtain the estimate.

14. The computer-readable media of claim 9, wherein the operation of computing an estimate of active nodes remaining to respond to an enumeration request in the computer network comprises:
computing an unbounded estimate of active nodes remaining to respond to the enumeration request as a function of a timing round duration in the computer network; and
applying the lower bound to obtain the estimate.

15. The computer-readable media of claim 9, wherein the operation of computing an estimate of active nodes remaining to respond to an enumeration request in the computer network comprises:
computing the estimate of active nodes remaining to respond to the enumeration request in a current round as a function of a previously computed estimate of active nodes remaining to respond to the enumeration request in a previous round.

16. The computer-readable media of claim 9, wherein the operation of computing an estimate of active nodes remaining to respond to an enumeration request in the computer network comprises:
computing the estimate of active nodes remaining to respond to the enumeration request in a current round as a function of a count of all nodes that sent an enumeration response in a previous round.

* * * * *